June 4, 1946.  J. M. PEARSON ET AL  2,401,371
ELECTRICAL PROSPECTING METHOD AND APPARATUS
Filed May 2, 1935   3 Sheets-Sheet 1

INVENTORS
John M. Pearson &
Charles R. Nichols
BY Busser & Harding
ATTORNEYS

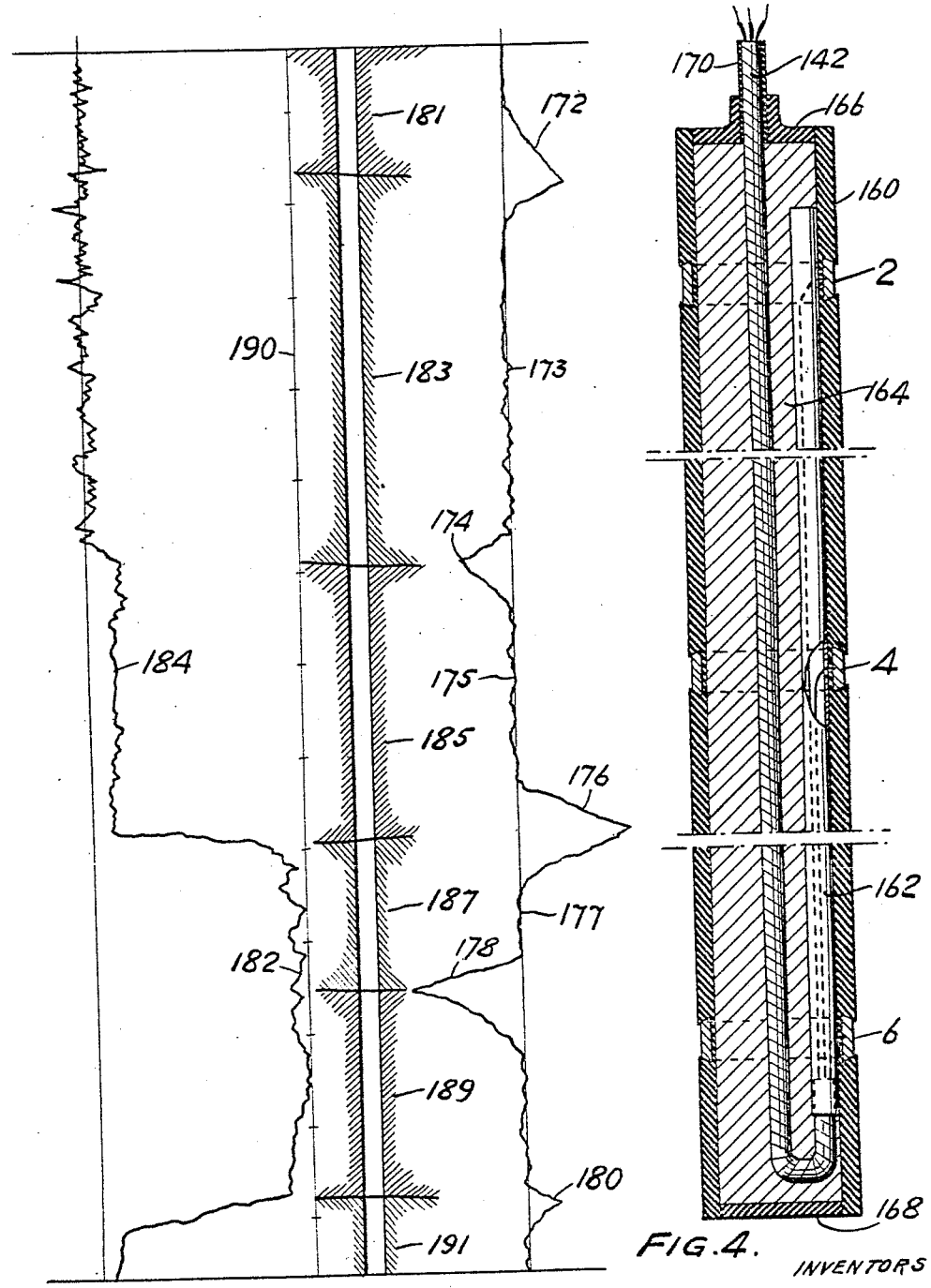

Patented June 4, 1946

2,401,371

UNITED STATES PATENT OFFICE 2,401,371

ELECTRICAL PROSPECTING METHOD AND APPARATUS

John M. Pearson, Aldan, Pa., and Charles R. Nichols, Dallas, Tex., assignors to Sperry-Sun Well Surveying Company, Philadelphia, Pa., a corporation of Delaware Application May 2, 1935, Serial No. 19,434

6 Claims. (Cl. 175—182)

This invention relates to a method and apparatus for effecting determination of the nature of geological formations penetrated by bore holes. Specifically the present invention relates to a simultaneous determination of variations of resistivity at separating boundaries and permeability of formations at various depths. By simultaneous determinations of variations of resistivity and permeability, deductions may be made as to the character and content of the formations penetrated. Additionally the invention relates to the determination of apparent average specific resistivity in such manners as to obtain the best approximation to its true value.

Proposals have been made for the measurements of specific resistivities of rocks traversed by bore holes by lowering into such holes electrodes arranged to produce current flow in the rocks and determining, by exploratory electrodes, drops of potential between geometrically determinable points. Such measurements require necessarily the production of currents of known magnitude between the electrodes within the bore hole.

To prevent polarization, and to differentiate the exciting current from stray and/or other currents, it is desirable to provide alternating current excitation. Normally three electrodes are located in the liquid (drilling mud or water) in the bore hole and a fourth is located at the surface, one of those in the bore hole and the fourth at the surface being those between which potentials are measured. The other two electrodes within the hole are used for the introduction of current, and since their leads pass upwardly and are wound together, the current circuit is substantially non-inductive.

In accordance with the present invention the primary desire to obtain indications of the changes of resistivities across geological discontinuities, such as bedding planes separating beds of different lithology, and gradational changes of resistivity. The indications are such that there are qualitatively indicated the magnitudes of the changes. From the standpoint of the present invention and the interpretation of the results, it is primarily of interest to know the location of a discontinuity and whether or not an increase or decrease of resistivity occurs in passing such discontinuity in a given direction. Qualitative indication of the magnitude of the change is also given, though this may be masked if the planes of discontinuity are not at right angles to the axes of the bore holes. When the slopes of such planes are known from other circumstances, however, more accurate deductions of the magnitudes of changes may be made.

The invention is also concerned with the determination of apparent average specific or apparent resistivities (where they may be legitimately approximated at all) under such conditions that the results secured represent the closest approach to true values of specific resistivities of the strata concerned.

While measurements concerning changes of resistivity alone are of interest and substantial value, there is provided, according to the present invention, an arrangement whereby there are measured spontaneously generated potentials. These potentials include the well known electrofiltration potentials which arise due to the flow of liquids through permeable formations, electrochemical potentials of osmotic nature, etc. The measurements of potentials of these types give information concerning permeability, though they are not limited to such interpretation. Measurements of both these spontaneously generated potentials and variations in potentials due to resistivity changes are carried out simultaneously, using only three electrodes within the bore hole with one exploring electrode continuously responsive both to artificially produced alternating potentials indicative of variation of resistivities and to direct potentials indicative of permeability conditions. The four electrodes may, of course, be located and movable within the bore hole.

In accordance with the present invention apparatus is provided whereby the separate indications, though superimposed in the detecting apparatus, are automatically separated to give continuous indications on automatic recording apparatus. In its preferred form this recording apparatus produces side by side graphical records indicative of resistivity variations versus depth and changes in spontaneously generated potentials with depth so that comparison and interpretation of records at corresponding depths will indicate the nature of the strata traversed.

It may be noted that linear conditions are practically always encountered in explorations such as those here considered and hence there occurs no rectification of the alternating currents artificially produced in the strata and, accordingly, no production of artificial direct potentials which might, in a non-linear system, be superimposed on, and measured with, those of spontaneously generated type.

The invention and its objects, particularly those relating to details of apparatus, will be apparent from the following description read in conjunction with the accompanying drawings, in which:

Fig. 1. is a diagrammatic view illustrating the association of the present apparatus with a bore hole;

Fig. 3 is a wiring diagram showing the internal connections of a recorder;

Fig. 4 is a longitudinal section through the electrode supporting element designed to be lowered in a bore hole; and Fig. 5 is a diagram showing the type of record produced by the apparatus, there being superimposed thereon a sectional diagram indicating the correspondence of the graphs with various strata.

Figure 1:
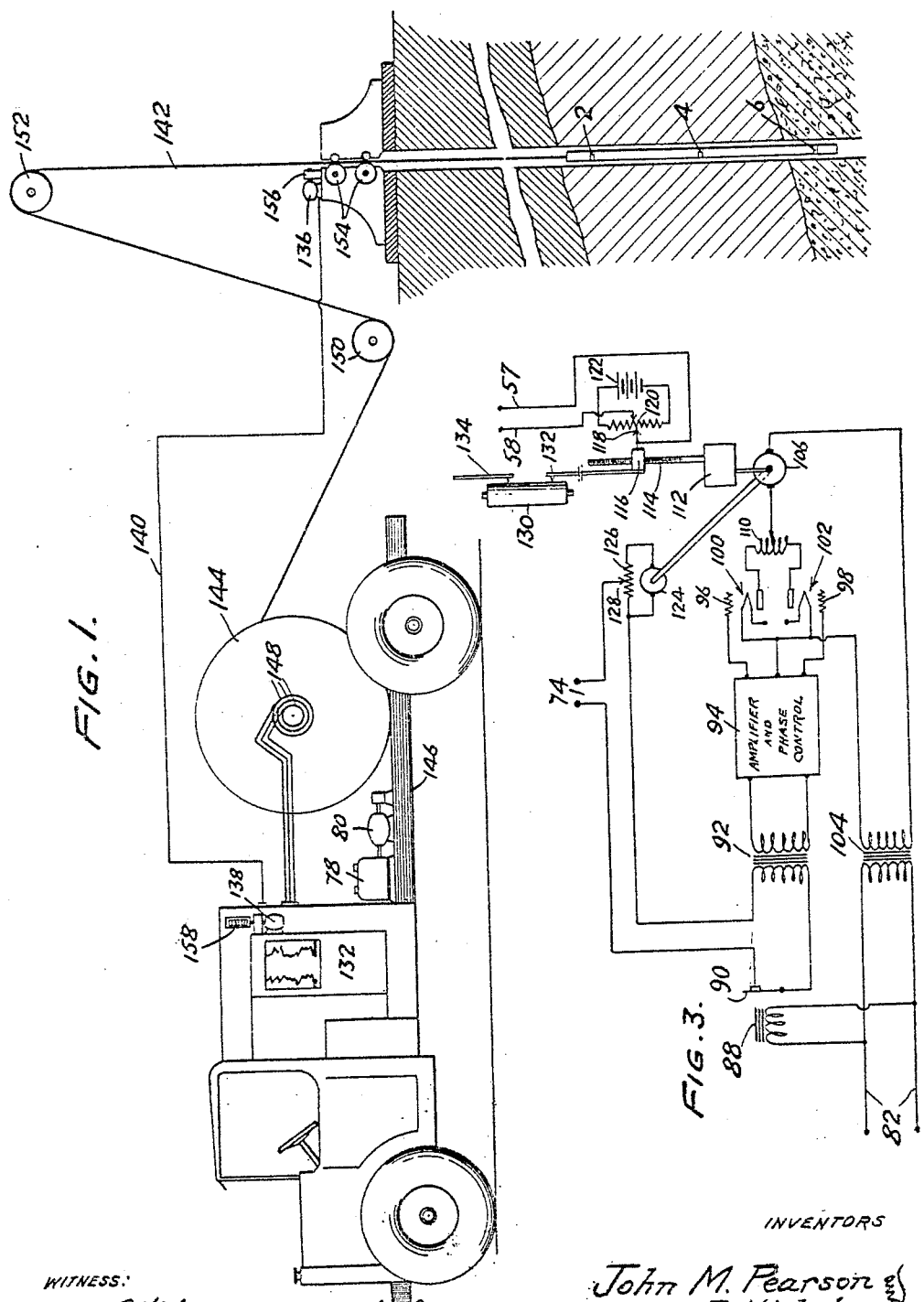
Figure 2:
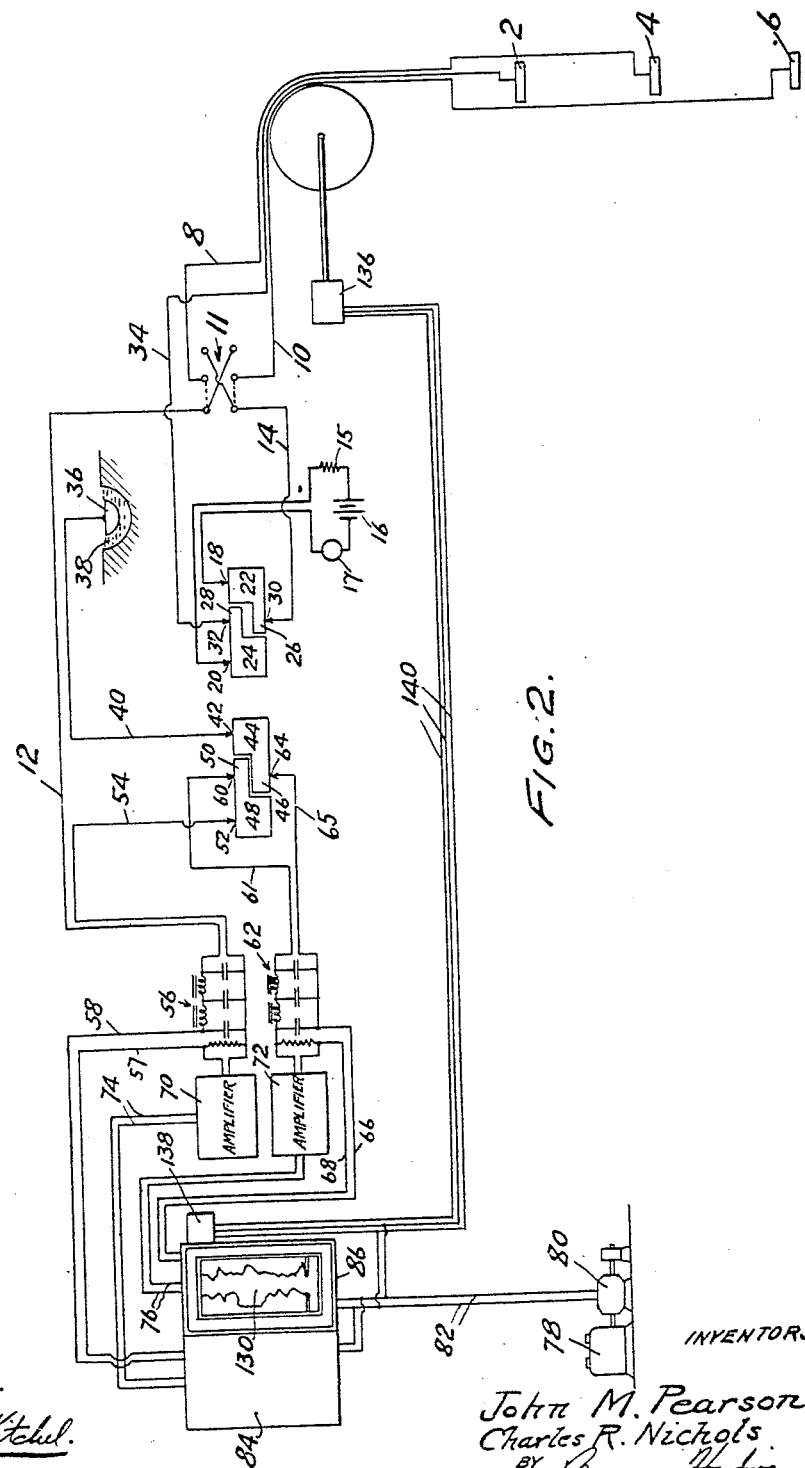
Fig. 2 is a wiring diagram showing particularly the means whereby the superimposed potentials are separated and recorded.

The nature of the apparatus which is preferably used in carrying out the invention will be clear from a consideration of Figs. 1, 2 and 3. The matter of mechanical considerations will be deferred until after a detailed consideration of the electrical construction of the apparatus and to this extent reference will be made initially primarily to Figs. 2 and 3.

In carrying out the method of the present invention, there are lowered into the bore-hole three electrodes designated 2, 4 and 6, the preferred method of assembly of which will be described later. It is sufficient to initially state that such electrodes preferably take the form of rings, fixedly spaced from each other, which are exposed to the mud within the bore-hole to afford electrical contact therewith. Other forms of electrodes, for example, non-polarizable types, may be used but, as will be clear hereafter, since the desired results are of a comparative nature it is not necessary to have other than ordinary metallic electrodes, preferably of lead. The electrodes are connected to the surface by individual wires, carried within an armored or rubber covered cable. The electrodes 4 and 6 are connected respectively to wires 8 and 10 which, at the surface, are connected to the knife element of a double-pole double-throw switch 11 so that they may be selectively connected to the leads 12 and 14. The purpose of this is merely to provide a reversal of the connections, if it is desired to make apparent average specific resistivity determinations at particular points. To facilitate the present description, it will be assumed that the switch connections are made to the left, as indicated in dotted lines, so that the wire 8 is connected to lead 12 and wire 10 to lead 14.

A battery or other source of nearly constant current indicated at 16, adapted to supply, for example, about one-half an ampere, which may or may not be measured depending upon the results desired, is connected through brushes 18 and 20 to slip rings 22 and 24, which are electrically connected to equiangular commutator segments 26 and 28 respectively. Brushes 30 and 32 contact with the commutator segments so as to alternately engage them, and are in turn connected to leads 14 and 34, respectively, the latter of which is connected through the cable to the upper electrode 2. The commutator is driven at a relatively low speed to supply to the electrodes 2 and 6 an alternating current having a frequency which desirably is less than twenty-five cycles. A low frequency is required in view of the high inductance in the lead from the exploring electrode, which as will be brought out later, is wound upon a reel, its length depending upon the maximum depth at which the electrodes are to be used. The impedance of the resulting coil, if even a moderately high frequency is used, is too high to permit the obtaining of proper results. It may be noted that inductance in the current producing circuit is low since both leads run together through the cable and are hence wound to produce a non-inductive circuit. Attention may be called to the fact that the commutator segments 26 and 28, of which two are illustrated in the diagram although there may be more alternately connected to the rings 22 and 24, have a substantial angular spacing, the purpose of which is to insure proper commutation.

The exploring circuit involves the surface reference electrode indicated at 36, which may be of lead or of non-polarizing character and is located, for instance, in the slush pit 38 or in some other suitable electrically remote place. For all depths of consequence of the electrodes 2, 4 and 6, the reference electrode 36 may be considered at infinity if it is in the slush pit.

The reference electrode 36 is connected by a lead 40 to a brush 42 bearing upon a slip ring 44 which is connected to a commutator segment 46. A second slip ring 48 is connected to another commutator segment 50. A brush 52 contacts with the slip ring 48 and is connected by a lead 54 to one of the input terminals of a filter 56, the other input terminal of which is connected to the lead 12. Brushes 60 and 64 bear upon the commutator segments 46 and 50. The two commutators mentioned are carried by a single shaft driven at suitable speed by a motor through reduction gearing and are so arranged relative to their respective brushes that reversals of the contacts occur simultaneously, that is, so that central parts of the insulation segments pass under the brushes at the same instants. It may be noted that the segments 46 and 50 are not spaced from each other by insulation to the same angular extent as the segments 26 and 28.

The brush 60 is connected by a lead 61 to one of the input terminals of the filter 62, while the brush 64 is joined by a lead 65 to the other input terminal of filter 62.

The filters 56 and 62 are similar in form and are of low-pass type. They terminate substantially in high resistances, the terminals of which are connected respectively to the amplifiers 70 and 72, which are in the nature of vacuum tube voltmeters of the usual type, and give across their output terminals, indicated at 74 and 76, respectively, voltages whose polarity depends upon the input polarities and which are zero when the input voltages are zero. The terminating resistances of the two filters act as grid leaks and are as high as possible considering the type of insulation between the commutator segments 46 and 50. Resistances of the order of one megohm are in general satisfactory to give good results. In series with the high terminating resistances are potentiometer resistances of comparatively negligible values. Connections to these are through leads 57 and 58 from filter 56 and 66 and 68 from filter 62.

The outputs from the amplifiers 70 and 72 serve to control electrically identical pieces of apparatus in the form of automatic recording potentiometers indicated at 84 and 86 respectively. These potentiometers are of known form but to indicate their action in the present arrangement, a schematic diagram of one of them is illustrated in Fig. 3. That illustrated in this figure corresponds to 84, into which extend the leads 57, 58 and 74. In the case of the potentiometer 86, leads 66 and 68 correspond to leads 58 and 57, and leads 76 correspond to 74 in their internal connections.

To effect operation of the automatic recording potentiometers, there must be provided a source of alternating current. In the present case this is provided by a portable power plant consisting of an internal combustion engine 78 driving an alternator 80 connected by leads 82 to the apparatus. This supply of alternating current which may, for example, be twenty-five or sixty cycle, is not critical as to frequency or voltage and hence an ordinary small portable power plant may be used.

Referring particularly to Fig. 3, an electromagnet 88 is connected across the alternating current line 82 and serves to act upon the magnetic diaphragm of a microphone indicated at 90 which is connected to the leads 74 is series with the primary of a transformer 92 and a damping voltage source described below. The secondary of transformer 92 feeds an amplifier and phase control arrangement of conventional type, indicated at 94. The output impedance of this amplifier and phase control unit has its ends connected respectively to the grids 96 and 98 of gas-filled triodes, preferably of the mercury vapor type, indicated at 100 and 102. The secondary of a transformer 104 is connected at one end to the cathodes of the tubes 100 and 102 and at the other end to the armature of a series motor 106 whose armature winding is connected to the center of a series field winding 110 whose ends are connected respectively to the anodes of the tubes 100 and 102. These tubes must be of sufficient capacity that the current passing through them after break-down will be ample to operate the motor 106 which, through gearing 112, drives a screw 114 threaded into a carriage 116 serving to move a contact 118 along the resistance 120 of a potentiometer supplied locally with current by a battery 122. The lead 58 heretofore referred to, which is connected to the filter 56, is joined to a central portion of the resistance 120. The sliding contact 118 is connected through the other lead 57 to the filter so that the potentiometer potential is algebraically added to that resulting from the input to the filter and the sum applied to the amplifier 70. One end of a resistance 126 shunted across the output terminals of a small generator 124 of the electrical tachometer type is connected to the primary of the transformer 92, while an adjustable contact 128 connects one of the leads 74 with the resistance 126 so as to bring more or less of this resistance into the microphone circuit to introduce any desired portion of the terminal voltage of the generator into this circuit. The generator 124 is provided with a constant field by a permanent magnet and is driven by the motor 106.

The carriage 116 is also connected to the recording pen 132 which produces a graph upon the recording sheet 130. Instead of providing separate recording sheets for the two potentiometers 84 and 86, only a single one is provided which is shown as associated directly with the potentiometer 86, the connection between the carriage 116 and the pen 132 being of an extended character so that recording by this pen, as well as the pen 134 associated directly with the potentiometer 86, may be effected. The driving connections for the pen 134 are identical with those for the pen 132 and are provided in the potentiometer 86, which has exterior connections as described above corresponding to those of the potentiometer 84. By the arrangement illustrated, it will be obvious that the markings directly opposite each other on the graph correspond to the settings of the two potentiometers at corresponding times. Comparison is thereby very much facilitated, as indicated below.

The recording sheet 130 is fed at a rate corresponding to the feed of the cable on which the electrodes are lowered or raised. This may be effected either through a direct drive or, preferably, through a synchronized electrical drive, inasmuch as it is usually inconvenient to locate the truck which carries the apparatus closely adjacent the upper end of the bore hole. There are diagrammatically illustrated at 136 and 138, respectively, a synchronized generator and motor which may be of the Selsyn type, connected by leads 140.

The cable containing the leads from the electrodes 2, 4 and 6 is indicated at 142 and is adapted to be reeled upon a drum 144 mounted on a truck 146, electrical connection being effected through slip rings 148 in the usual fashion. The cable passes from the drum 144 about a guiding pulley 150 and thence over a pulley 152 supported by a suitable derrick directly over the top of the bore-hole. Before entering the bore hole, the cable passes in tight contact with rollers 154, which, through gearing, preferably of a change speed type to secure a suitable scale of feet of hole per inch of chart, drive the generator 136 of the synchronized system. Direct measurement of the lowering or raising of the cable at the point directly over the entrance to the bore hole is desirable, since at this point each length of the cable in the bore hole has already received the total stretch which will be imparted to it and accurate indications of the depth of the electrodes may be secured. A tally 158 in the form of a counter may be provided on the truck so as to indicate directly to the operator the depth of the cable. The charts may, of course, be provided with suitable markings to indicate their advance in synchronization with the cable.

The electrode assembly is indicated in Fig. 4 and comprises an insulating tubular casing 160 provided with circumferential grooves within which are located the electrodes 2, 4 and 6, which, as indicated previously, may consist of lead expanded within the circumferential grooves to be retained rigidly therein. The cable 142 containing three leads to the electrodes passes downwardly into the casing and at its lower end is turned upwardly to project the leads upwardly into a steel tube 162 provided with openings in its sides through which the ends of the leads may project in insulated manner to form electrical contact with the electrodes 2, 4 and 6. The cable 142 is armored with steel and is retained within the casing 160 by filling the interior of the casing with lead 164. The casing itself may be of Bakelite or other suitable insulating material and is closed at its upper and lower ends by insulating plugs 166 and 168 of similar material secured therein by insulating cement. The lead filling is particularly useful since it is necessary that the assembly be weighted so as to sink, despite the buoyant effect of the mud within the bore hole, upon the cable. The cable passes through an opening in the upper plug 166 and its armor is surrounded for a substantial distance above this plug with a rubber or other insulating cover 170 secured to the plug 166. This insulated covering of the cable must extend upwardly to a distance at least several times the spacing between adjacent electrodes. The total insulation of all metallic parts except the electrodes is necessary, since the presence of any conductive metal within the mud in the vicinity of the electrodes would seriously affect the readings. In order that various electrode assemblies may be attached to the same cable, there is preferably provided a coupling of conventional type connecting a short section of cable extending from the electrode assembly to the end of the main length.

To minimize the effect of mud within the hole, the spacing between adjacent electrodes should preferably be greater than five times the diameter of the bore hole. It is found desirable to have the electrodes spaced about four feet from each other, since the strata of importance are in general more than three feet thick. The spacing of the electrodes, however, may vary quite considerably anywhere from the minimum requirement imposed by the diameter of the bore hole for the detail desired upwardly without limit. Too large spacing is to be avoided, however, since with it the effects of thin layers of rock become unnoticeable unless it is desired to get indications of materials at considerable distances from the hole. If the electrodes are close to each other, then fine structures may be detected.

In this connection it may be pointed out that when the surface electrode 36 is distant from the nearest electrode in the bore-hole by more than twenty times the spacing of the bore-hole electrodes from each other, it may be considered, for even most accurate calculations, as located at infinity. For practical purposes, however, the reference electrode need not be distant from the power electrodes by more than six or seven times their spacing from each other.

In order to understand the type of results attained by the above apparatus, consideration may be given to a typical graph indicated in Fig. 5, in which the right-hand graph is produced by the automatic potentiometer responsive to the variations in center electrode potential due to varying resistivities of the strata and the left-hand graph by the potentiometer responding to the spontaneously generated direct potentials. Each graph will have occurring thereon a series of ripples attributable to varying conditions at the electrodes as, for example, varying positions of the electrodes relative to the walls of the bore-hole and changes in contact resistances at the surfaces of the electrodes. Such ripples are accordingly to be disregarded. The graphs will, however, in general show major disturbances of the types indicated in the figure, those in the resistance variation graph being, in general, of the nature illustrated at 172, 174, 176, 178 and 180, and consisting of surges relative to a zero line of the graph, these throws being more or less localized at the boundaries between various strata. In the case of the graph of the spontaneously generated potentials, variations from the zero line extending through substantial depths as indicated at 182 and 184 will, in general, occur. These variations may, in some instances, pass to the other side of the zero line indicating a change of direction of flow or a change of concentration or contents of fluids. Usually when a bore-hole is filled with mud the pressure within the hole will be greater than that of liquids, namely, oil or water, in the strata and consequently flow will take place from the bore-hole into the permeable strata. In certain cases, however, for example, where large gas pressures occur, a reverse condition may result, the effect of which will be the inversion of a potential due to the filtration. Potentials of electrochemical origin may also have different signs depending upon, for example, relative salinities of the liquids in a hole and adjacent formations.

The various strata corresponding to the graphs are indicated at 181, 183, 185, 187, 189 and 191. By a suitable setting of the apparatus with respect to polarity, surges to the right of the types indicated in the continuity of the right hand graph, reading downwardly, may indicate changes from low to high resistance strata, or reverse changes if the surge occurs oppositely. It may be noted that the resistivities of strata are determined by the liquid contents of the pores inasmuch as most of the rock materials have very high resistivities. The surge indicated at 172 might represent, for example, a change from a relatively low resistance stratum 181 to a relatively high resistance stratum 183, which latter would have a thickness corresponding approximately to the distance between the peaks of surges 172 and 174 of the graph. The direct potential graph corresponding to this strata indicates substantially zero potential and it would therefore be assumed that the rock was impermeable and of high resistance, as, for example, limestone. It might be noted that the magnitude of the surge 172 in the graph would represent roughly, in a qualitative fashion at least, the magnitude of the ratio of resistivities of the strata on opposite sides of the boundary indicated by it. If the surge is considerable, a considerable resistivity ratio would be deduced. If, on the other hand, the surge was not so marked, a relatively small ratio would be indicated.

Between 174 and 176 there would be indicated a stratum 185 of slight permeability (since this would cause both electro-filtration and electrochemical potentials to be small) and lower resistance than that immediately above. This stratum might, for example, be shale.

Between 176 and 178 a stratum 187 of relatively high resistance and high permeability is indicated. This would normally be interpreted as oil sand. Below this oil sand there would be indicated a stratum 189 of relatively quite low resistance and high permeability probably consisting of sand containing salt water. The next stratum 191 would be indicated as of higher resistance and lower permeability.

As indicated above, the direct potentials recorded by the apparatus might not be due to electrofiltration alone. There would be superimposed on such potentials, potentials due to electrochemical effects produced, for example, by varying salt concentrations of the liquids through or adjacent which the exploratory electrode passes. For purposes of interpretation it is not important whether the direct spontaneously generated potentials are ascribed to electrofiltration or electrochemical causes since large potentials would usually indicate substantial permeability whether the potentials were electrochemical or electrophysical in origin.

There is considered herein primarily the arrangement in which the switch 11 is closed to the left as viewed in Fig. 2 whereby the electrode 4 becomes the exploratory electrode and electrodes 2 and 6 are used to lead current into the earth. It will be noted that mere change of the double-throw switch 11 serves to effect the alternative use of either 4 or 6 as the exploratory electrode. The provision of this switch is desirable since by the use of 6 as the exploratory electrode apparent average specific resistivities may be determined.

Such resistivities may be readily calculated in known fashion if alternating current of known amount is supplied to the electrodes 2 and 4 and the potential is measured between electrodes 6 and 36. In order to facilitate determination of the potentials from the graph, it is desirable to supply a constant current. This may be accomplished either by the use of a constant current D. C. generator, or, alternatively, by a relatively high voltage in series with a resistance quite high as compared with the resistance variations to be expected between the electrodes 2 and 4 within the bore hole. Such resistance is indicated at 15, a D. C. ammeter 17 being used to serve as a check upon the constancy of the current. If the resistance 15 is sufficiently high, the variations in resistance between electrodes 2 and 4 are negligible. The meter 17 reads the average direct current supplied and consequently, since the commutator 44—48 makes contact at all times that the circuit is closed through commutator 22—24, the markings on the graph are proportional to average potentials, so that a comparison between the readings of the graph and the meter 17 may be legitimately made.

In accordance with the present invention, the determination of the apparent average specific resistivities is made with the electrode assembly in the position where most reliable results can be obtained, namely, when the electrode assembly is in such position that the central electrode potential is zero, for example, in the case of conditions of the type indicated in Fig. 5, when the assembly is at depths corresponding to 173, 175 and 177. By making the resistivity measurements in this fashion with the assembly located substantially centrally between the boundaries, various disturbing factors are minimized and consequently legitimately comparable values of average specific resistivities are obtained.

It may be pointed out that the use of an end electrode rather than a central electrode for exploratory purposes would displace the resistance variation graph from zero by an amount depending upon the average specific resistivity of the strata in the neighborhood of the electrodes.

The operation of the apparatus may be best considered by taking into account separately the effects corresponding to resistance and permeability variations of the strata. The readings, which are indicative of variations of resistance, are caused by changes in the alternating potential between the electrodes 4 and 36 assuming, as above indicated, the position of the double-pole double-throw switch indicated in dotted lines in Fig. 2. The permeability indications, on the other hand, result from the unidirectional potential between the electrodes 4 and 36. The separation of these two potentials for measuring purposes will be understood by considering first the alternating potential between electrodes 4 and 36 due to the production of alternating current flow between the electrodes 2 and 6.

There is interposed in the circuit between electrode 36 and lead 54 the commutator arrangement 44—50. The apparatus between the brushes 60 and 64 can obviously have no effect in producing any reversal in polarity between electrode 36 and lead 54 and consequently alternating voltage applied across the electrodes 4 and 36 is presented to the filter 56 as such. The capacity input of the filter 56 furnishes a low impedance path to the alternating current and consequently there is, between the brush 52 and the lead 12, very little impedance to alternating current. Since the filter 56 is of the low-pass type, only a negligible alternating voltage will be imposed across its output terminals. The amplifier 70 consequently will show no response in its output leads 74 to the alternating potential across 4 and 36. It may be noted that between leads 57 and 58 there is only a part of the low potentiometer resistance 120, negligible relative to the terminating resistance of the filter.

While forming part of the alternating current circuit, the brushes 60 and 64 do not receive alternating current from their commutator which, because of its synchronous relationship with the commutator 22—28, produces a pulsating unidirectional voltage across these brushes and therefore across the input terminals of the filter 62, and a filtered D. C. potential across the input of the amplifier 72 which accordingly responds, causing, as will be pointed out later, indications of the recording potentiometer 86, which thereby produces records from which variations of resistivity may be deduced. A unidirectional potential is impressed across the potentiometer resistance in 86 corresponding to 120 of 84.

On the other hand, if it is assumed that a constant potential exists between the electrodes 4 and 36 due, for example, to electrofiltration effects, there is produced a direct voltage across the input terminals of filter 56 since again it can be considered that the commutator 44—50 cannot produce any reversal in its series circuit. Amplifier 70 accordingly responds, effecting operation of the potentiometer 84. The direct current, however, passing between the electrodes 4 and 36, gives rise to alternating current through the medium of commutator 44—50 with the result that an alternating potential is imposed across the input terminals of the filter 62, which now acts like the filter 56 in the preceding case and prevents response of the potentiometer 86.

From the above it will be seen that the two potentiometers respond selectively to alternating and direct voltages between the electrodes 4 and 36. Their responses are produced by the direct currents flowing through the leads 74 and 76 and are identical in nature, hence there will be considered only the response to current through leads 74 affecting the potentiometer 84 which comprises the elements illustrated in Fig. 3.

Referring to that figure, it will be obvious that unless current is flowing in the circuit including leads 74, there will be no response in the secondary of the transformer 92 produced by the microphone 90 which is magnetically affected by the electromagnet 88 connected across the alternating supply 82. It is further obvious that the phase relationship between the alternating supply line 82 and the output of the transformer 92 is dependent upon the direction of the direct current flow in the microphone-transformer circuit. By the proper adjustment of the amplifier and phase control 94 and connection of the grids 96 and 98 to the opposite terminals of the output impedance of this amplifier, one or the other of the grids can be made to become sufficiently positive to produce a break-down in the corresponding tube when the plate voltages become positive. Which grid will become positive to cause its tube to break down depends only upon the direction of flow of current in the microphone circuit. The direction of rotation of the motor 106 depends upon the tube which breaks down and the connections are such that the slider 118 is so moved as to impose a series potential between leads 57 and 58 so as to bring the input voltage of the amplifier 70, and hence the microphone current, to zero and thereby prevent breakdown of either of the tubes 100 and 102. The position of the slider to effect this balance is reflected in the mark of the pen 132 upon the chart 130.

The object of the generator 124 acting through the resistance 126 is merely to provide a dead-beat arrangement, the connections being such that this generator tends to prematurely produce a balance by generation of a voltage in the microphone circuit opposing that introduced by the amplifier 70, whereupon a tendency to stop the motor occurs and the generator becomes relatively ineffective. In this way the slider is caused to creep to the point of balance without overrunning, thereby producing a dead-beat response. The events occur at such a rapid rate, however, that with a proper setting of the variable contact 128 which controls the rapidity of attainment of balance, a proper balance may be secured in a time of the order of one second.

The operation of the potentiometer 86 is identical and produces records on the chart corresponding in time to those produced by the action of the potentiometer 84. The arrangements of such potentiometer at present available are such as to produce balance with an accuracy of the order of 0.1%.

It is to be noted that the resistance and permeability potentials are applied simultaneously to the exploring electrode and that separation of responses is effected even though both are continuously applied and produce currents flowing simultaneously in various parts of the apparatus. If it is desired to measure resistivities alone, the source may be direct rather than alternating if the potentials produced by such source are large compared with the spontaneously generated potentials.

The chart may be initially marked as indicated at 190 to conveniently indicate the depth at which various breaks in the graphs occurred.

The type of apparatus herein disclosed is used for the various well-known purposes of electrical logging. The logs which are obtained may be interpreted by those skilled in the art and are, in general, of so reliable a nature that no cores need be taken during the drilling in a region where previous correlations have been made. When cores are taken, the deductions from their examination may be supplemented by the results of measurements of the type indicated herein. At the same time various other data obtained during the drilling or from subsequent examinations of the hole may be examined and interpreted. Correlation of these various results is, of course, the procedure which gives the most valuable information. It may be pointed out particularly that the electrical log can be depended upon to give the location of all the oil sands which are penetrated and also an approximation to their probable productivity.

The necessity for correlating the results of the method herein described with other knowledge of the strata penetrated obtained from actually taking cores, particularly in new districts, should not be overlooked. It is from experience gathered in this fashion that the ability to make proper deductions from the electrical logs alone is acquired. In other words, an empirical background must be built up for the interpretation of the graphs, since they are affected by so many unknown factors that it cannot generally be definitely said that they are susceptible of being interpreted in a theoretical sense.

By integrating the resistivity variation log a somewhat better picture may be obtained of the approximate variations of resistivities encountered by the hole. Such a graph referred to a proper base line can frequently be used to advantage.

There has been mentioned above the possibility of using different electrode assemblies to be attached by a suitable coupling to the same cable. If two assemblies are used having different electrode spacing, in each of which the central electrode is used as the exploratory electrode, being equally spaced from the current electrodes, it will be found that the shapes of the surges in the resistivity record will be modified. There will be sufficient similarity, however, even if the surges are small and hence almost masked by the irregularities which normally occur, to permit boundaries to be identified. A check run with different electrode spacing is therefore useful to clear up doubts, caused, for example, by cave-ins, variations in hole size, etc.

While mention has been particularly made of a reference electrode effectively located at infinity, it may be pointed out that the method and apparatus herein disclosed may be used in connection with a reference electrode carried down the hole along with the others. Of course the logs directly obtained must be interpreted quite differently to take into account the fact that the reference electrode, as were the others, is passing through variable conditions.

It is, of course, important to determine in all cases the precise paths of the bore-holes in which determinations are being made, since the indicating apparatus at the surface shows the distance measured down the bore-hole which may differ quite substantially from the vertical depth if the bore-hole is crooked. Consequently it is important that the bore-hole used should be carefully surveyed by an accurate instrument of the type indicated in the patent to Williston and Nichols, No. 1,960,038, dated May 22, 1934.

What we claim and desire to protect by Letters Patent is:

1. The method of determining the location and character of strata penetrated by a bore hole containing a liquid comprising lowering into said bore hole three electrodes fixedly spaced from each other and having surface connections, locating at the surface a fourth electrode, supplying alternating current to two of the electrodes within the bore hole, rectifying the alternating component of the potential between the third and fourth electrodes and recording the value of said rectified potential, and recording automatically simultaneously the value of any direct component of potential existing between the third and fourth electrodes.

2. The method of determining the location and character of strata penetrated by a bore hole containing a liquid comprising producing within the strata surrounding the bore hole alternating currents, lowering into the bore hole an exploratory electrode, rectifying the alternating component of the potential of said electrode relative to a predetermined datum, inverting any direct component of potential of said electrode relative to a reference datum, applying said alternating potential and direct potential to the input end of a low-pass filter, applying said rectified and inverted potentials to the input end of another low-pass filter, and recording the output potentials of said filters.

3. The method of determining the apparent average specific resistivity of a stratum penetrated by a bore hole containing a liquid comprising determining the upper and lower boundaries of said stratum, and lowering within the bore hole to a position midway between the boundaries of the stratum three electrodes having predetermined spacing from each other, supplying reversed current to two of the electrodes within the bore hole, and determining the potential of the third electrode relative to a reference datum, the third electrode being asymmetrically located relative to the other two.

4. A system for logging a borehole comprising a pair of electrical circuits each including a pair of electrodes, means for moving at least one electrode of each pair along the borehole in fixed spaced relation to each other, means for impressing a voltage across one pair of electrodes, means for periodically reversing the direction of said voltage, and means, in the other circuit, for separately and simultaneously exhibiting the effect on said circuit of the voltage impressed across the first pair of electrodes and of the natural earth potential between said second pair of electrodes comprising a pair of potentiometers, each including a voltage recording device, means for periodically reversing the voltage reading on one of said devices due to the impressed voltage across the first pair of electrodes while maintaining the voltage reading due to natural earth potential thereon unidirectional and means for periodically reversing the voltage reading on the other of said devices due to the natural earth potential while maintaining the voltage reading thereon due to the impressed voltage on the first pair of electrodes unidirectional.

5. A system for logging an oil well comprising a pair of electrodes, means for moving said electrodes in spaced relation to each other along the well, means for impressing a voltage across said electrodes thereby setting up a field of electrical energy between them, said field including the earth around the well and being affected thereby, a second pair of electrodes, one of which is adapted to move along the well in spaced relation to the first pair and in the field of electrical energy set up by the first pair, and the other of which is adapted to be stuck in the ground at the surface, electrical connections between said second pair of electrodes comprising a pair of potentiometers each including a voltage recording device, one of said potentiometers being permanently connected in series with said second electrodes, a pair of terminals on said second potentiometer, means for connecting each of said terminals first with one electrode and then with the other in periodic sequence, and means for reversing the direction of the current in the circuit containing the first pair of electrodes with the same periodicity.

6. The combination with a geophysical apparatus having electrode means for sampling electric fields created within a bore hole, of an automatic compensator comprising: a potentiometer connected with said electrodes incorporating a balancing circuit, and an electrical balancing device therein; driving means for urging said balancing device in opposite directions; a pair of operating circuits controlling said driving means; an electronic valve in each operating circuit; and a dual control circuit incorporating said electronic valves and normally maintaining a bias thereon whereby both of said operating circuits are held open, said control circuit incorporating means electrically associated with said sampling means and responsive to fluctuations in said electric field, for removing the bias on either of said electronic valves and closing the corresponding operating circuit.

JOHN M. PEARSON.
CHARLES R. NICHOLS.